United States Patent
Kelly

(10) Patent No.: US 6,594,354 B1
(45) Date of Patent: Jul. 15, 2003

(54) METHOD AND APPARATUS FOR ALERT CONTROL ON A COMMUNICATIONS SYSTEM

(75) Inventor: Paul Kelly, Galway (IE)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/434,954

(22) Filed: Nov. 5, 1999

(51) Int. Cl.[7] .................................................. H04M 3/42
(52) U.S. Cl. ............................. 379/201.1; 379/373.02; 379/376.02
(58) Field of Search ................ 379/106.09, 201.01, 379/201.06, 201.1, 207.03, 207.12, 207.16, 372, 373.01, 373.02, 373.04, 373.05, 376.02, 913, 179

(56) References Cited

U.S. PATENT DOCUMENTS

| | | | | |
|---|---|---|---|---|
| 4,601,064 A | * | 7/1986 | Shipley | 340/825.44 X |
| 4,649,385 A | * | 3/1987 | Aires et al. | 340/825.49 X |
| 4,932,050 A | | 6/1990 | Davidson et al. | 379/211 |
| 5,363,425 A | * | 11/1994 | Mufti et al. | 379/38 |
| 5,379,319 A | * | 1/1995 | Satoh et al. | 379/355.02 |
| 5,406,618 A | * | 4/1995 | Knuth et al. | 379/88.04 |
| 5,548,637 A | | 8/1996 | Heller et al. | 379/201 |
| 5,596,633 A | * | 1/1997 | Meier et al. | 379/201.01 |
| 5,712,911 A | * | 1/1998 | Her | 379/420.01 |
| 5,822,418 A | * | 10/1998 | Yacenda et al. | 379/201.01 |
| 5,825,864 A | * | 10/1998 | McGraw et al. | 379/210.1 |
| 5,901,211 A | | 5/1999 | Dean et al. | 379/211 |
| 5,930,702 A | * | 7/1999 | Goldman et al. | 455/417 |
| 6,125,176 A | * | 9/2000 | Foladare et al. | 379/913 X |
| 6,347,133 B1 | * | 2/2002 | Galbreath | 379/67.1 |
| 6,480,593 B1 | * | 11/2002 | Munday et al. | 379/211.02 |

FOREIGN PATENT DOCUMENTS

| | | |
|---|---|---|
| EP | 000740482 A1 | * 10/1996 |
| WO | WO 98/26566 | 6/1998 |

* cited by examiner

*Primary Examiner*—Scott L. Weaver
(74) *Attorney, Agent, or Firm*—William M. Lee, Jr.; Barnes & Thornburg

(57) ABSTRACT

A switching system in which telecommunications features are improved by the proximity status of a predetermined user to a communications terminal. Proximity status information deduces a predetermined user's presence or absence to answer incoming calls on a communications terminal associated with the predetermined user and silences the audible alert if the predetermined user is absent from the area. The proximity status information may also be used to control security features on a terminal so that only the predetermined user can use the terminal when the predetermined user is deduced to be present.

23 Claims, 3 Drawing Sheets

METHOD AND APPARATUS FOR ALERT CONTROL ON A COMMUNICATIONS SYSTEM

FIELD OF THE INVENTION

The present invention generally relates to apparatus and methods for use in communications networks. More specifically, the present invention can be utilized to control alert and security functions on a communications system.

BACKGROUND OF THE INVENTION

It's good to talk, and the way things are going it has never been easier. Communications have been enormously successful in recent years and we are now living in a highly connected society. With the overwhelming growth of communication networks, there are more communication devices currently in use around the world and the market is growing fast.

The social and cultural consequences of this boom in communications, however are often overlooked and are far reaching in today's society. One such consequence is the irritation and confusion caused by unanswered alerts from communication devices. Heads turn when a phone rings. Indeed, it is uncommon to work in an open-plan office environment without the ring of someone's communication device sounding. This distraction of an unanswered communication device can reduce concentration and increase stress among workers. All of these factors reduce productivity significantly. As a result of these factors it is becoming increasingly common for office workers to take work home with them to work more productively in uninterrupted silence.

While it is often possible to manually change security and alert features on a telephone, it is laborious to do so. It also requires forward planning, and therefore requires the setting up of the feature in advance of leaving the area. Indeed, it is often so complicated to activate these features that people do not bother, or even forget how to activate them.

There is one known advanced communication arrangement disclosed in U.S. Pat. No. 4,932,050 issued to W. A. Davidson et al. This utilizes a proximity detector to gather status information to define the presence or absence of a person to a station set without identifying a particular person. However, this arrangement merely detects the presence of any person within the vicinity of a telephone and does not address the problem of identifying the presence a particular person to a communications terminal associated with that person.

There may exist other reasons for automating features of communications terminals and networks, for example, enabling and disabling a terminal according to whether the predetermined user is present or absent. One such use may be of particularly utility in security conscious environments. This may also be useful in an environment in which an owner of a particular communications terminal or connection does not want anyone using it while they are away. This would prevent unauthorized users from making calls from other people's communications terminals.

It would, therefore, be desirable for a communications system to automatically control features of a terminal or communications network based on the absence or presence of a predetermined user to receive or make calls. It would also be desirable to automate security features of a terminal based on the presence or absence of a predetermined user to a terminal associated with the predetermined user.

SUMMARY OF THE INVENTION

In accordance with the present invention, a method and apparatus are provided for controlling an alert function of a communications terminal, the terminal being associated with a pre-determined user for receiving an incoming call over a telecommunications network, the terminal alert function being for presenting to the predetermined user an audible alert of the incoming call.

Additionally, a method and apparatus are provided for enabling or disabling a communications terminal, the terminal being associated with a predetermined user for sending an outgoing call or receiving an incoming call over a telecommunications network.

The presence and absence of the predetermined user is deduced from indeterminate information. Such indeterminate information may come from, for example, monitoring devices connected to the communications network.

An advantage of the alert being controlled according to the presence or absence of the predetermined user is that it can reduce the disturbance caused by the alerts of communication terminals when their user's are not present to receive incoming calls.

BRIEF DESCRIPTION OF DRAWINGS

The foregoing features of the invention, as well as the invention itself may be more fully understand from the following detailed description of the drawings, in which.

DETAILED DESCRIPTION OF THE PREFERRED EMBODIMENT

Figure 1:
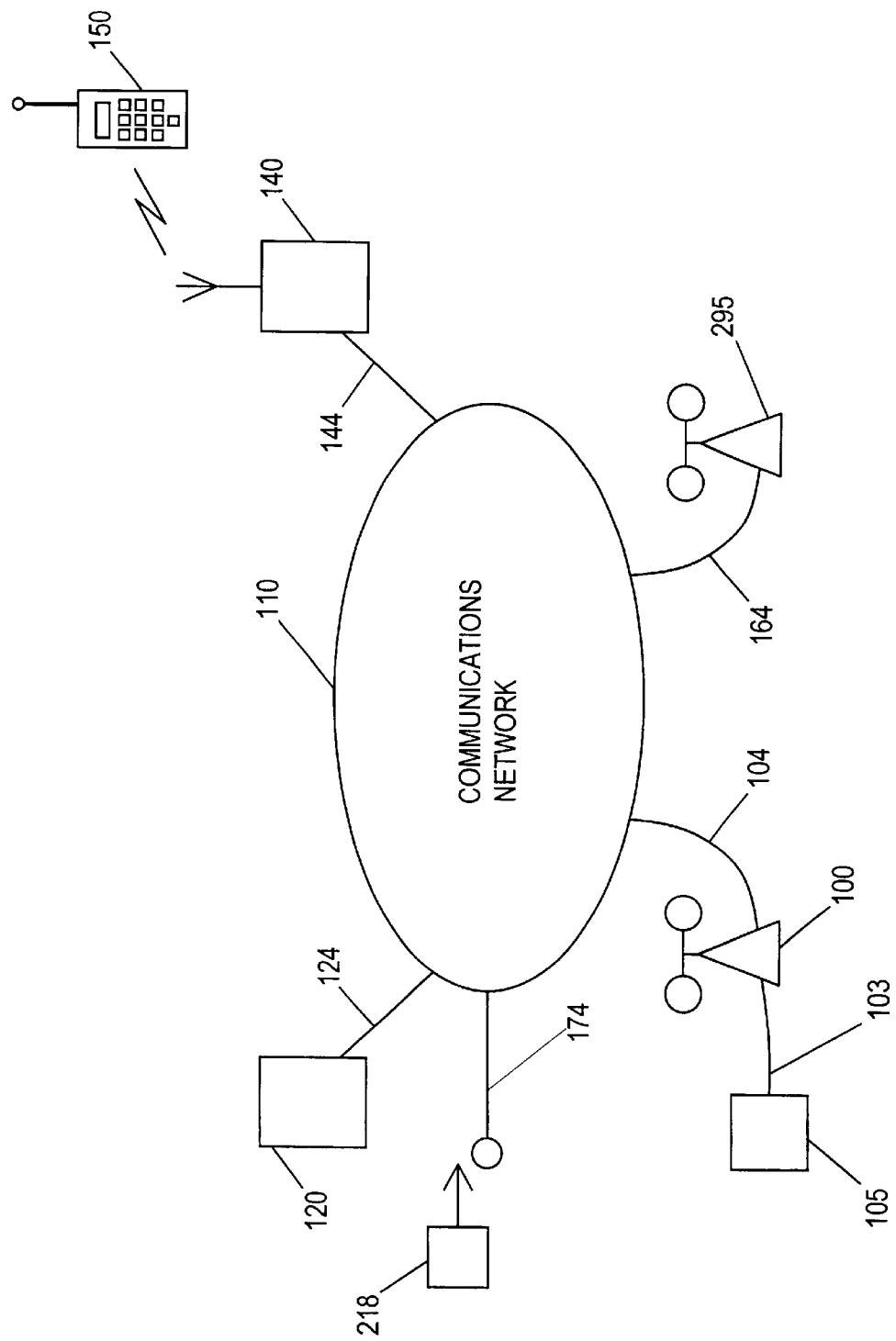
FIG. 1 is a block diagram of apparatus arranged to carry out an embodiment of the invention.

FIG. 1 is a block diagram of apparatus arranged to carry out an embodiment of the invention. Referring now to FIG. 1, communication receiver 100 may be provided as a stand alone device connected to a PSTN or a terminal connected to a PABX to alert the predetermined user to an incoming call or message. The exemplary communications terminal 100 of FIG. 1 is for descriptive purposes only. Although the description may refer to terms commonly used in describing particular communications devices, a description and concepts apply equally to other communication devices having architectures dissimilar to that shown in FIG. 1, that alert or notify the person of an incoming call or message.

Communications terminal 100 is coupled to a communications network 110, which may be provided, for example, as a public switched telephone network. Communications network 110 may also be provided as a private automated branch exchange (PABX) or IP switching system. Communications terminal 100 is connected to communications network 110 by a line 104. Circuitry 120 for determining whether the predetermined user is present to receive the incoming call is connected to the communications network 110 by a line 124. A secondary terminal 295 associated with the predetermined user is also connected to the communications network 110 by a line 164. As may be seen, another terminal associated with the predetermined user, for example, a mobile terminal 150 associated with the predetermined user, is connected to the communications network via base station 140 by a line 144. An incoming call signal to the predetermined user 218 is carried by the line 174 to the communications network 110. Alert controller 105 is connected to communications terminal 100 by line 103. Alert controller 105 may also be connected directly to communications network 110 for controlling alerts on one or a plurality of communications terminals.

Figure 2:
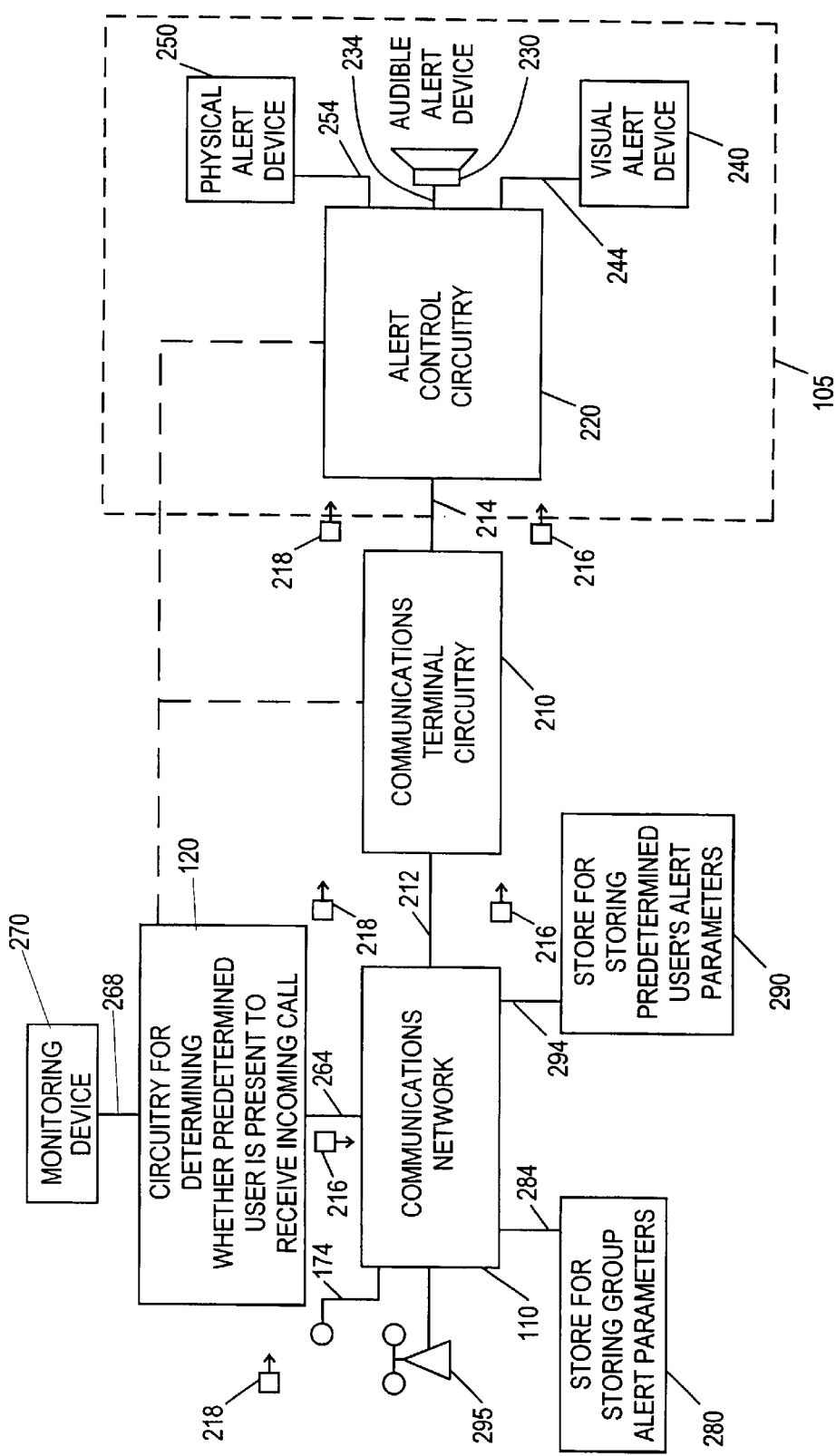
FIG. 2 is a block diagram illustrating the alert controller for use in the apparatus of FIG. 1 for alerting a predetermined user to an incoming call.

FIG. 2 is a block diagram illustrating the alert controller for alerting a predetermined user to an incoming call according to a preferred embodiment of the invention. Referring now to FIG. 2, the alert controller 105 may be provided as a stand alone device or as an appendage to any communication device such as a telephone, a pager, a personal digital assistant, a computer or any other device connected to a communications network. The exemplary alert controller 105 of FIG. 1 is for descriptive purposes only. Although the description may refer to terms commonly used in describing particular communication devices the description and concepts apply equally to other communication devices and networks having architectures dissimilar to that shown in FIG. 1, that alert a predetermined used to an incoming call.

Communications terminal circuitry 210 is coupled by a line 212 to a communications network 110, which may be provided, for example, as a public switch telephone network (PSTN), a private automated branch exchange (PABX), or an IP switching network. Communications terminal circuitry 210 is connected to alert control circuitry 220 by a line 214. A physical alert device 250 is connected to alert control circuitry 220 by a line 254. Physical alerting may take the form of a vibrating attention-getting device that may be worn by the predetermined user or be attached to a piece of furniture, say the user's chair. A line 234 connects alert control circuitry 220 with an audible alert device 230. Audible alert device 230 may be implemented using an transducer or a speaker. Other ways of controlling the alert function other than reducing the volume include changing the pitch, tone, sequence of notes, or in the case of the alert being a sound sample such as a recorded message, a change to a different sound sample.

Additionally in the preferred embodiment, a visual alert device 240 is connected to alert control circuitry 220 by a line 244. Visual alert device 240 may be implemented either as part of the communications terminal or external to it, for example, using a light emitting diode, a light bulb, an alpha numeric display, or a message appearing on a computer or communications terminal associated with the predetermined user.

As may be seen, circuitry 120 for determining when the predetermined user is present to receive an incoming call is connected to communications network 110 by a line 264. It should be noted the circuitry 120 for determining whether the predetermined user is present to receive the incoming call may alternatively be connected to communications terminal circuitry 210 and alert control circuitry 220. The circuitry for determining whether the predetermined user is present is arranged to deduce the presence from indeterminate information about the presence of the predetermined user.

A monitoring device 270 is connected to circuitry for determining whether predetermined user is present to receive incoming call 120 by a line 268. The monitoring device 270 may be provided, for example, as a system that monitors the location and status of a predetermined user. This may report the predetermined user's location to the circuitry for determining whether the predetermined user is present to receive an incoming call 120. Examples of this monitoring device 270 are a security system which monitors predetermined user's locations. This might include image recognition circuitry, voice recognition circuitry, passive or active radio loop circuitry, figure print recognition circuitry, smart card or swipe card circuitry or any other method for positively identifying people. More examples include a terminal connected to a network, reporting the activity status of the predetermined user on that terminal.

Circuitry 120 for determining whether the predetermined user is present to receive an incoming call sends a signal indicating the state of the predetermined user to receive an incoming call 216 to the communications network 110 over line 264. The signal 216 is sent to the alert control circuitry 220 via the communications terminal circuitry 210. When an incoming call is received, an incoming call signal 218 is transmitted from the communications network 110 to communications terminal circuitry 210 on line 212. In other embodiments, the line 212 connecting the communications network 110 and the communications terminal circuitry 210 may be a wireless connection. It should also be noted that all other lines represented may be implemented by wireless, optical or electrical links.

The alert control circuitry 220 determines whether the predetermined user is absent or present from the signal indicating the state of the predetermined user to receive an incoming call 218 and processes the alert according to parameters in the store for predetermined user's alert parameters 290 and the store for storing group alert parameters 280. The parameters in stores 280 and 290 are accessible via the alert control circuitry through the communications network 110 via lines 284 and 294 respectively. For example, if signal 216 indicates the predetermined user is not present to receive incoming call then the alert control circuitry 220 will control the alert according to parameters in stores 280 and 290. Examples of group parameter include time, location, rank of user in the organization or any other prioritization factors, a centralized time-based factor to enable an organization to control the disturbance from alerts at certain times, e.g. lunch times, occasions when silence is desirable or when noise levels are tolerable. The processing of the alert may be more fully understand with reference to FIG. 3.

Figure 3:
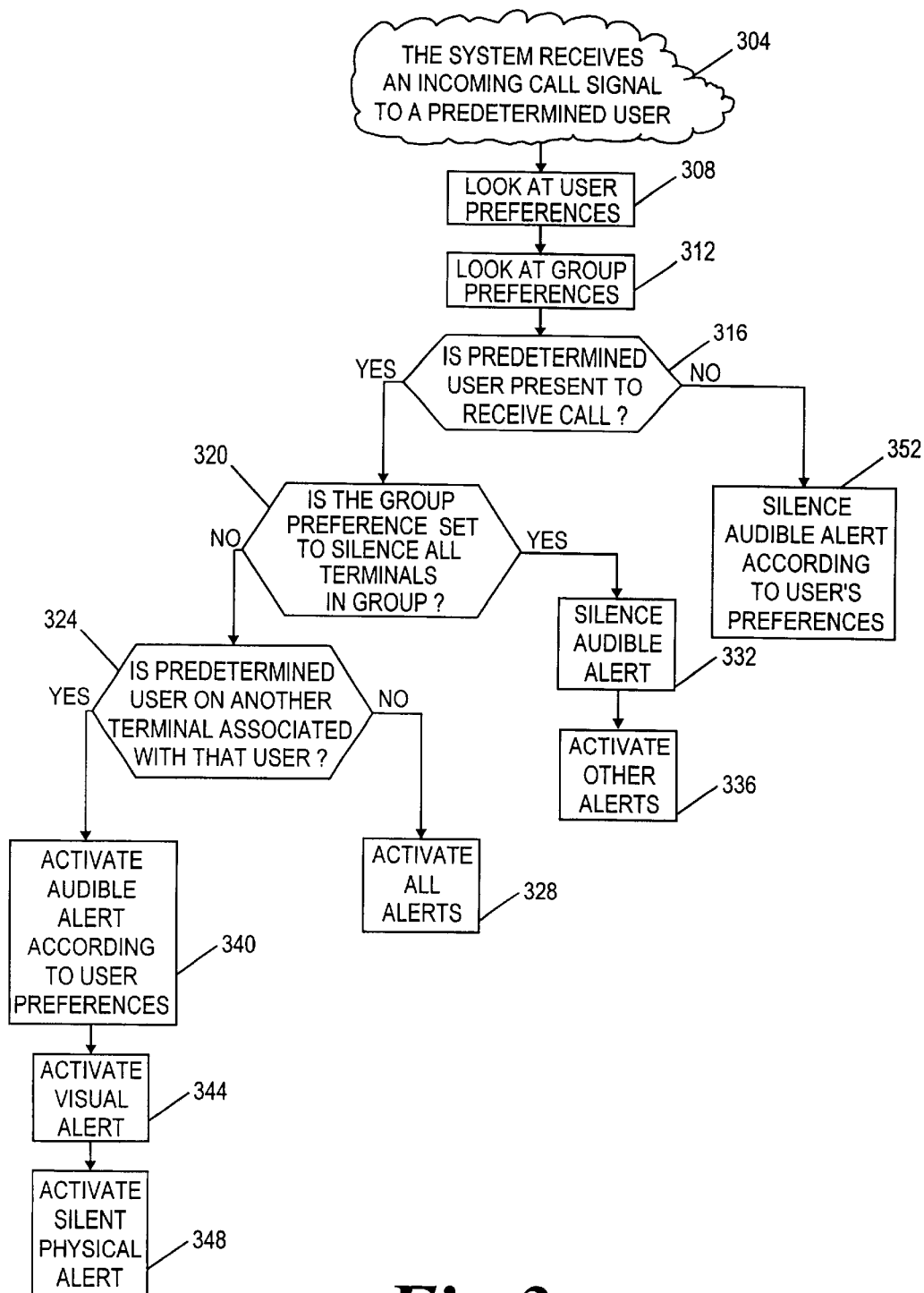
FIG. 3 is a flow diagram illustrating the processing of an alert in response to an incoming call signal.

FIG. 3 is a flow diagram illustrating the processing of an incoming call signal to a predetermined user according to the preferred embodiment. Referring now to FIG. 3, whenever the communications terminal associated with a predetermined user receives an incoming call signal 218 (step 304), it queries the user parameters (step 308) and the group parameters (step 312) for alert control instructions. Next, the alert control circuitry 220, of FIG. 2 determines if the predetermined user is present to receive the call by determining the state of signal 216 of FIG. 2 (step 316). Signal 216 of FIG. 2, in the first state, indicates that the predetermined user is present incoming call, and in the second state, indicates that the predetermined user is not present to receive an incoming call. If signal 216 is the first state, then the alert control circuitry queries the group parameters to check whether all terminals in the group are set to have their audible alerts audibly silenced. If the group parameter is set to silence all terminals in the group the alerts is silenced (step 332) and the physical and visual alerts are activated according to the user and group parameters (step 336). Provided the group parameter is not set to silence all terminals or this particular terminal in the group, then a check is made to determine whether the predetermined user is on another terminal associated with the user 295 (step 324) if the predetermined user is on another terminal associated with that user 295 then the alerts are activated according to the user parameters. In the preferred embodiment, the audible alert is silenced whilst the visual and physical alerts are activated to alert the user to an incoming call on another terminal or DN (steps 340, 344 and 348). As mentioned, the alert parameters for this situation are stored in the store for storing predetermined user's alert parameters of FIG. 2. If the predetermined user is not using another terminal associated with that user when an incoming call signal arrives 218 then all alerts are activated according to the parameters of the user (step 328).

Should the predetermined user not be present to receive an incoming call, then alerts are silenced in accordance with user's parameters (step 352).

I claim:

1. Apparatus for controlling an alert function of a communications terminal, the terminal being associated with a predetermined user for receiving an incoming call over a telecommunications network, the terminal alert function presenting to the user at least an audible alert of the incoming call, the apparatus comprising circuitry for determining whether the user is present at said communications terminal to receive the incoming call and a controller for controlling the alert function according to the determination of the user's presence at the communications terminal, wherein the controller disables at least an audible alert part of the terminal alert function if any one of the following conditions is determined:

i) the user is not present at the communications terminal;

ii) the user is present at the communications terminal but a stored alert parameter of the predetermined user is set to disable at least said audible part of the terminal alert function; and iii) the user is present at the communications terminal but a stored group alert parameter is set to disable at least said audible part of the terminal alert function.

2. The apparatus of claim 1, wherein the circuitry for determining whether the predetermined user is present is arranged to deduce the presence from indirect indications about the presence of the predetermined user.

3. The apparatus of claim 1, wherein the controller is arranged to control the alert additionally according to a user definable parameter.

4. The apparatus of claim 2, for use in a network comprising a plurality of the communications terminals, the apparatus further comprising circuitry for setting the user definable parameter according to input from any of the communications terminals.

5. The apparatus of claim 2, further comprising circuitry for setting the user definable parameter using the terminal associated with that user.

6. The apparatus of claim 1, wherein the controller is arranged to control the alert additionally according to a group parameter defined for multiple users.

7. The apparatus of claim 1, wherein the controller is arranged to enable or disable the communications terminal according to the presence or absence respectively of the predetermined user.

8. The apparatus of claim 1, wherein the controller is arranged to control the alert by changing the volume of the audible alert.

9. The apparatus of claim 1, wherein the circuitry for determining the presence of the predetermined user is located remotely from the terminal.

10. The apparatus of claim 1, wherein the circuitry for determining the presence of the predetermined user is arranged to deduce the user is absent by detecting when the predetermined user is using another terminal also associated with that user.

11. A switch for a telecommunication network for transmitting calls between terminals, the switch comprising the apparatus of claim 1.

12. A terminal for receiving calls over a telecommunication network, the terminal comprising the apparatus of claim 1.

13. A method for controlling an alert function of a communications terminal, the terminal being associated with a predetermined user for receiving an incoming call over a telecommunications network, the terminal alert function presenting to the user at least an audible alert of the incoming call, the method comprising the steps of determining whether the user is present at the communications terminal to receive the incoming call and controlling the alert function according to the presence of the user at the communications terminal, the method including the step of disabling at least an audible alert part of the terminal alert function if any one of the following conditions is determined:

i) the user is not present at the communications terminal;

ii) the user is present at the communications terminal but a stored alert parameter of the predetermined user is set to disable at least said audible part of the terminal alert function; and iii) the user is present at the communications terminal but a stored group alert parameter is set to disable at least said audible part of the terminal alert function.

14. The method of claim 13, further comprising deducing the presence of the predetermined user from indirect indications about the presence of the predetermined user.

15. The method of claim 13, further comprising arranging the controller to control the alert additionally according to a user definable parameter.

16. The method of claim 14, for use in a network comprising a plurality of the communications terminals, the method further comprising setting the user definable parameter according to input from any of the communications terminals.

17. The method of claim 14, further comprising setting the user definable parameter using the terminal associated with that user.

18. The method of claim 13, further comprising controlling the alert additionally according to a group parameter defined for multiple users.

19. The method of claim 13, further comprising enabling or disabling the communications terminal according to the presence or absence respectively of the predetermined user.

20. The method of claim 13, further comprising controlling the alert by changing the volume of the audible alert.

21. The method of claim 13, further comprising determining remotely from the terminal the presence of the predetermined user.

22. The method of claim 13, further comprising deducing the absence of the user by detecting when the predetermined user is using another terminal also associated with that user.

23. Software stored on a computer readable medium which causes a switch to perform the steps of:

determining whether a predetermined user is present at a communications terminal associated with said user to receive an incoming call;

controlling an alert function according to the presence of the user at said communications terminal; and disabling at least an audible alert part of the terminal alert function if any one of the following conditions is determined:

i) the user is not present at the communications terminal;

ii) the user is present at the communications terminal but a stored alert parameter of the predetermined user is set to disable at least said audible part of the terminal alert function; and iii) the user is present at the communications terminal but a stored group alert parameter is set to disable at least said audible part of the terminal alert function.

* * * * *